Sept. 18, 1962 P. C. GOLDMARK 3,054,860

MAGNETIC RECORDING APPARATUS

Filed July 7, 1958

INVENTOR.
PETER C. GOLDMARK
BY
Brumbaugh, Free, Graves & Donohue
HIS ATTORNEYS

United States Patent Office 3,054,860

Patented Sept. 18, 1962

3,054,860

MAGNETIC RECORDING APPARATUS

Peter C. Goldmark, New York, N.Y., assignor to Minnesota Mining & Manufacturing Company, St. Paul, Minn., a corporation of Delaware Filed July 7, 1958, Ser. No. 746,810

1 Claim. (Cl. 179—100.2)

The invention relates to magnetic tape recording and reproducing apparatus and, more particularly, to tone control means for such apparatus.

Magnetic tape recorders are widely used in the recording and reproduction of program material. A permanent record is made by passing a magnetic tape adjacent to a recording head and causing the magnetic particles carried by the tape to be magnetized in a manner representative of the program material being recorded. To reproduce the program, the tape is passed adjacent a playback head to induce therein a signal from the oriented particles.

To reproduce a signal with minimum frequency distortion, the relation between the playback head and the tape must be precisely the same as the relation previously obtaining between the tape and the recording head in the recording operation. With the advent of prerecorded tapes, and especially the new slow speed tapes, it is difficult to design a recorder with a playback head aligned for any prerecorded tape program. As an example of how accurate the alignment must be, a 1½ micron gap head for a tape moving at 1⅞" per second giving 15 kc. response with normal ½" track width, has to be accurately aligned within 1 part in 2000.

Therefore, it is an object of this invention to provide new and improved tape recorder and reproducer apparatus embodying means enabling the playback head to be adjusted with respect to the magnetic tape to obtain a desired frequency response.

It is another object of this invention to provide new and improved tape recorder and reproducer apparatus of the above character in which the position of the playback head relatively to the tape may be adjusted for optimum frequency response with any prerecorded tape.

According to the invention, the playback head is mounted so as to be capable of adjustment relatively to the tape to change the orientation of the gap in the playback head with respect to the record on the tape. By proper adjustment of the playback head, its gap can be put in the same position with respect to the magnetic tape as that previously assumed by the recording head, so that all frequencies will be reproduced without distortion. Similarly, by appropriate adjustment of the playback head, any desired high frequency roll-off may be obtained so that the mechanism serves as a convenient tone control.

The novel features of the present invention are set forth with particularity in the appended claim. The present invention both as to its organization and manner of operation together with further objects and advantages may best be understood by reference to the following description taken in connection with the accompanying drawing in which:

Figure 1:
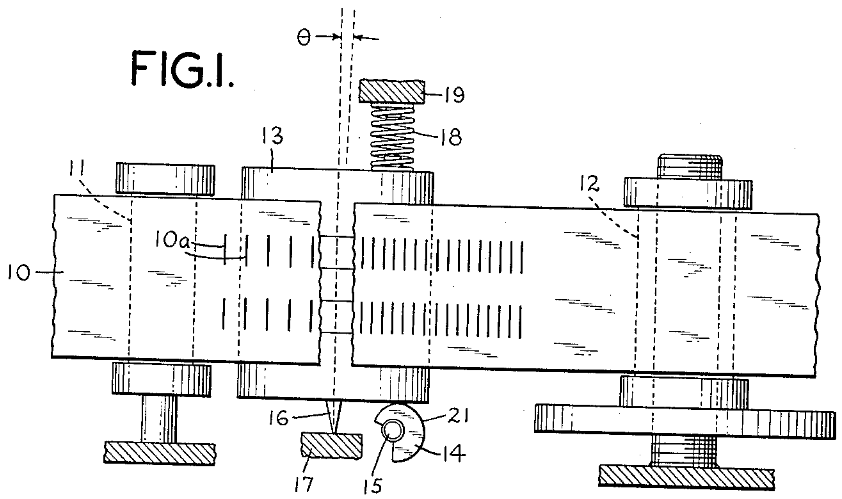
FIGURE 1 is a front view of tape reproducer apparatus constructed according to the invention in which the playback head is rotated about an axis perpendicular to the plane of the tape.

In FIGURE 1 of the drawing, a magnetic tape 10 is shown in normal reproducing position in front of the playback head 13. The tape 10 has recorded thereon contain intelligence represented by the parallel lines 10*a* extending transversely of the tape in a direction determined by the orientation of the recording gap in the head used in the recording operation. The tape passes over two guide rollers 11 and 12 as it is moved from right to left, for example, by conventional tape transport mechanism not shown. The playback head 13 which has very fine aligned gaps extending transversely of the tape 10, is shown as pivotally mounted at 16 on the frame portion 17. It is urged into engagement with a cam 14 by the action of the compression spring 18 interposed between the head 13 and the frame portion 19.

The cam 14 is carried by a shaft 15 journaled at 23 in the frame portion 22 and having an adjustable knob 20 on its other end. When the shaft 15 is rotated counterclockwise by turning the knob 20, the cam surface 21 urges the playback head 13 counterclockwise against the influence of the compression spring 18, changing the orientation of the playback head 13 relatively to the tape 10. Conversely, when the shaft 15 is turned clockwise, the playback head rides the surface 21 of the cam and the head rotates clockwise about the pivot point 16.

Since playback head 13 need be moved through only a relatively small angle to achieve the desired frequency response, in a practical device an enlargement of the movement by appropriate linkages between the knob and the cam should be provided to give a fine adjustment. However, a direct drive is shown in the drawing for simplicity of illustration.

Figure 2:
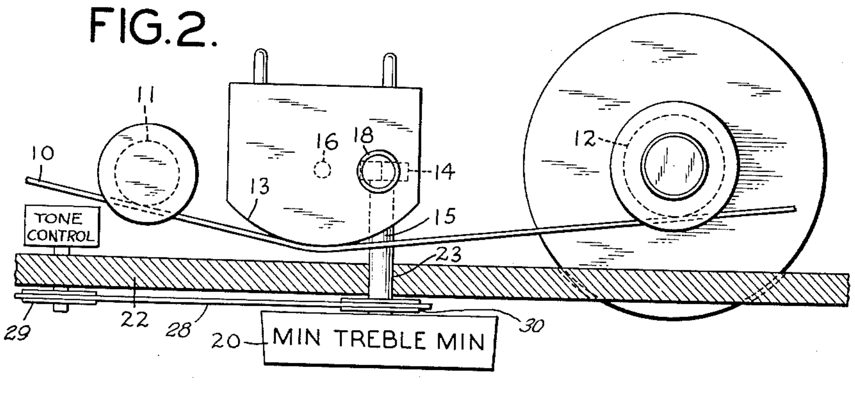
FIGURE 2 is a top view of the apparatus shown in FIGURE 1.
Figure 3:
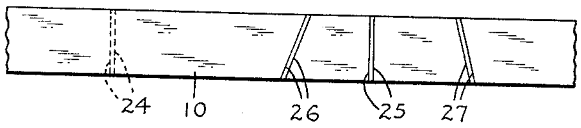
FIGURE 3 illustrates schematically several representative playback head positions relatively to the tape.

In operation and with reference to FIGURE 3, the dotted lines 24 designate the position of the recording head relatively to the tape 10 in the original recording operation. For reproduction without frequency distortion, the playing head gap must have the same orientation with respect to the tape 10 as indicated by the lines 25. It will be understood that this result can readily be achieved by manual adjustment of the knob 20 according to the invention. If it is desired to adjust the high frequency response of the recorder to a desired roll-off characteristic, the control knob 20 is turned either clockwise or counterclockwise so that the cam 14 and spring 18 cooperate to move the playback head 13 out of alignment with the recording head position. It will be understood that when the playback head gap makes an angle with the recording gap position as indicated in the lines 26 and 27 in FIGURE 3, for example, the effective gap width is increased so that the high frequency response of the reproducing apparatus is affected. To obtain high fidelity reproduction the knob is adjusted until maximum high frequency response is obtained, at which time the playback head assumes exactly the same position with respect to the tape as the recording head. If desired, the tone control knob could be connected by appropriate linkages such as a belt 28 and the pulleys 29 and 30 to conventional tone control circuitry 31 (FIG. 2) to introduce additional frequency variations in the system.

While several particular embodiments have been shown and described, it is apparent that changes and modifications may be made therein without departing materially from the invention in its broader aspects. Therefore, the aim in the appended claims is to cover all such changes and modifications.

I claim:

In tone control mechanism for magnetic tape reproducer apparatus having means defining a tape transport path for magnetic tape carrying a prerecorded magnetic signal of given orientation thereon and a playback head having a gap between pole pieces extending transversely of said tape transport path, the combination of means mounting said playback head for pivoting movement to enable adjustment of its orientation relatively to said tape transport path, mechanism including a finger actuatable member for moving said head selectively from a reference position in which the gap in said head is aligned with the orientation of said prerecorded signal to other positions in which different degrees of misalignment between said gap and said prerecorded signal obtain, corresponding to different high frequency rolloff characteristics, said finger actuatable member carrying indicia affording a visual indication of said reference position, additional tone control means for said apparatus, and means coupling said tone control means to said finger actuatable member for actuation thereby.

References Cited in the file of this patent

UNITED STATES PATENTS

| | | |
|---|---|---|
| 2,560,569 | Hare | July 17, 1951 |
| 2,673,897 | Rettinger | Mar. 30, 1954 |
| 2,712,572 | Roberts | July 5, 1955 |
| 2,879,126 | James | Mar. 24, 1959 |

FOREIGN PATENTS

| | | |
|---|---|---|
| 676,810 | Germany | June 12, 1939 |
| 524,589 | Belgium | Dec. 15, 1953 |
| 174,220 | Austria | Mar. 10, 1955 |
| 1,011,159 | Germany | June 27, 1957 |